United States Patent

Jahnke et al.

[15] 3,697,557
[45] Oct. 10, 1972

[54] PROCESS FOR THE ISOLATION OF ORGANIC HYDRAZO REACTIVE KETONES

[72] Inventors: Heinz K. Jahnke, Kalamazoo; Heinz F. MaYer, Portage, both of Mich.

[73] Assignee: The Upjohn Company, Kalamazoo, Mich.

[22] Filed: Feb. 8, 1971

[21] Appl. No.: 113,582

[52] U.S. Cl. ............................................260/397.45
[51] Int. Cl. ....................C07c 167/40, C07c 167/42
[58] Field of Search.................................260/397.45

[56] References Cited

OTHER PUBLICATIONS

" Steroids" by Djerassi et al., Pages 65 and 66 relied on.

Primary Examiner—Elbert L. Roberts
Attorney—John Kekich and Willard L. Cheesman

[57] ABSTRACT

This invention relates to the isolation of organic hydrazo-reactive ketones from a liquid environment containing them by reaction with an insoluble solid material containing available acylhydrazide groups, and includes the subsequent recovery of the ketone from the resulting hydrazone complex and regeneration of the acyl-hydrazide groups; the process being particularly adaptable to the separation of minor quantities of hydrazo-reactive steroid ketones from admixture with other steroids.

8 Claims, No Drawings

PROCESS FOR THE ISOLATION OF ORGANIC HYDRAZO REACTIVE KETONES

BACKGROUND OF THE INVENTION

It is known to react ketones with acyl-hydrazides carrying an ionic group for the purpose of their isolation and separation from water insoluble impurities. These prior acyl-hydrazides are exemplified by the substances known as Girard's Reagents, known to be capable of interacting with carbonyl compounds to form a hydrazone. This known hydrazone is water soluble and can thus be isolated from water insoluble impurities such as lipids by distribution between two immiscible solvents, for example water and ethyl acetate. After separation in the aqueous solution, the carbonyl compound can be regenerated by mild acid hydrolysis and recovered from the solution in known manner.

Girard's Reagents have not been widely used as means for isolating ketones for a variety of reasons, including the complicated manipulation of the two liquid phases during the regeneration and recovery phases of the process. Moreover the Girard's Reagent is relatively expensive, compared with the ketones conventionally occurring in commerce; and other, less expensive, means are usually available to effect such separations.

On the other hand reaction mixtures are produced in the manufacture of special ketones or special alcohols to which ordinary means of separation, i.e., distillation, fractional crystallization, precipitation and the like are not effective and to which special separation means must be applied. Of these special means, chromatographic separations are quite expensive and low-yielding; and the use of Girard's Reagents as mentioned above, likewise unsatisfactory.

Girard's Reagents are applicable to mixtures containing hydrazo-reactive ketones as a practical matter only in those instances where the ketone is present in minor amounts. Even in these instances the separation is disadvantageous, involving the manipulation of the immiscible liquid phases mentioned above.

Examples of reaction mixtures which contain hydrazo-reactive ketones are steroid reaction mixtures composed of ketones such as the commonly occurring steroids having the $\Delta^4$-3-ketone A-ring structure, found in such compounds as cortisone, hydrocortisone, and the like. These steroid compounds having hydrazo-reactive keto groups, i.e., the 3-keto group, occur in minor amounts in a variety of reaction mixtures containing no keto groups or, more commonly, keto groups which are not hydrazo-reactive.

In this specification the term "hydrazo-reactive ketone" refers to compounds having keto groups which react readily on heating with acyl-hydrazides to form the corresponding hydrazone. The term is used to differentiate between those reactive ketone groups such as are present in the A-ring of $\Delta^4$-3-keto steroids and other non-reactive ketone groups, notably the 3-ketone in the A-ring of $\Delta^{1,4}$-3-keto steroids. As most organic ketones theoretically can react to form hydrazones, it is to be understood that the term is intended to exclude those that are so relatively unreactive as to require prolonged reaction times and unusually intensified reaction conditions, and which can hence be regarded as practically unreactive.

This distinction based on practicable reactivity is an important one in the application of our invention to the manufacture of a wide variety of steroid products.

BRIEF DESCRIPTION OF THE INVENTION

We have discovered novel means and method for isolating hydrazo-reactive ketones from solutions containing them so as effectively to separate them from the solution phase by reaction with a solid insoluble reagent containing available acylhydrazide groups so as to produce the corresponding hydrazone bonding between the ketone and the reagent. This renders possible facile mechanical separation of the residual solution phase, freed of the hydrazo-reactive ketone.

The invention is especially valuable in the separation of small quantities of hydrazo-reactive ketones from a solution containing larger quantities of non-ketones or ketones that are not hydrazo-reactive. It is thus applicable to removing hydrazo-reactive ketones which occur as solution contaminants, and provides a ready means for the subsequent recovery of the ketones in pure form. It is thus also applicable to situations where the object is to isolate and recover valuable ketones from a large-volume solution-environment as in the case of dilute solutions of desired hydrazo-reactive ketones from naturally or synthetically occurring origins.

The solid insoluble reagent is characteristically a resin such as one of the cross-linked acrylics obtained by copolymerization of alkyl esters of acrylic acid or alkyl acrylic acid with a cross linking monomer such as divinyl-benzene, which has been further converted by reaction with hydrazine, preferably hydrazine hydrate. The resins that are included are those containing available acyl hydrazide groups such as are derivable by the above method. The copolymers mentioned above as well as others containing available alkoxycarbonyl groups such as carboxyalkyl cellulose can be thus converted.

As an example, the cross-linked resin product obtained by copolymerizing a lower alkyl (of from one to six carbon atoms) ester of acrylic acid or lower alkyl acrylic acid (of from one to six carbon atoms), with about 5 to 10 percent by weight of ortho, meta or para divinyl benzene is brought into reactive contact with about a molar reacting proportion of hydrazine. This can be accomplished by suspending the resin in hydrazine hydrate with or without the presence of a solvent for the latter (such as methanol) and subjecting the reaction mixture to heat. The reaction is desirably brought to substantial completion in order to maximize conversion of alkoxycarbonyl groups to acylhydrazide groups, the required length of time and degree of heating being dependent, as will be understood, upon the physical form and particle size of the resin.

The solid insoluble reagent thus prepared is one which characteristically has within its molecular structure available acylhydrazide groups. When this reagent is brought into reactive solution contact with hydrazo-reactive ketones such as hydrocortisone (cortisol) there occurs by interaction the formation of the hydrazone linkage

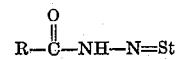

at each site of reactive contact, where the parameter R represents the bulk of the resin molecule and St represents the steroid moiety, and the double bond is the ketone-generated hydrazone linkage. Of course numerous linkages occur in each resin molecule, the ideally complete reaction achieving full "loading" of the reagent with isolated steroid molecular moieties. Conversion of a substantial proportion of the alkoxycarbonyl groups to acylhydrazide groups is naturally to be desired from the standpoint of economic and technologic efficiency. We have found that conversion of at least about one half of these groups is desirable, but less or more completeness does not interfere with the operativeness of the reagent in isolating the hydrazo-reactive ketone.

The character of the solution environment of the ketone is not critical. With most ketones the solvent is an inert organic liquid such as methanol, ethanol, hexane, ethyl acetate, or the like. It can contain other solutes that are non-reactive with the acylhydrazide groups such as alcohols, halides, nonreactive ketones and the like.

After the step of reactive solution contact, the solution and the insoluble reagent can be separated as by filtration, draining or the like, and the solution, freed of the ketone, can be subjected to appropriate treatment such as recovery of the remaining solutes.

The reagent, now charged with the reacted hydrazone can be treated with aqueous acid to regenerate the reagent as the original acyl hydrazide and to reconstitue and separate the original ketone now isolated. This can be accomplished by reacting the charged reagent with aqueous acid. We prefer to use a range of from pH 0.5 to pH 4.0 for this regeneration step. The lower pH value provides a faster regeneration, but invokes care in avoiding acid degradation of the regenerated hydrazo structure. The higher pH value provides a more stable environment for the regnerated hydrazide, but can result in lengthened reaction time.

In the case of regeneration of water-insoluble ketones, we have found it desirable to effect the regeneration with a mixture of aqueous acid and a solvent for the regenerated ketone. This avoids the possibility of "organic fouling" by preventing deposit of the regenerated ketone on the resin during this step.

Examples of resins containing alkoxycarbonyl groups, suitable for conversion to the acylhydrazide reagents for use in the practice of this invention are those alkoxycarbonyl containing resins such as the copolymer of methyl acrylate and para-divinyl benzene in the weight ratio of 90:10, the copolymer of methyl methacrylate and paradivinylbenzene in the weight ratio of 95:5, carboxymethyl cellulose, and the like.

Suitable candidate solutions containing hydrazo-reactive ketones and nonhydrazo-reactive ketones are the 1-dehydrogenation solutions resulting from the chemical or microbiological conversion of $\Delta^4$-3-keto steroids to $\Delta^{1,4}$-3-keto steroids. These solutions characteristically contain the object product ($\Delta^{1,4}$-3-keto) in major proportion, and the unconverted starting $\Delta^4$-3-keto compound in minor proportion. The former is non-hydrazoreactive whereas the latter is hydrazo reactive. Among these solution mixtures are:

A solution of cortisone in small quantities associated with prednisone. Such solutions occur in the chemical or microbiological 1-dehydrogenation of cortisone to produce prednisone.

A solution containing minor amounts of $11\beta$, 21-dihydroxy 4,17(20)pregnadiene 3-one associated in organic solution with $11\beta$, 21-dihydroxy 1,4,17(20) pregnatriene 3-one. This mixture occurs, for example, in the bioconversion of $11\beta$, 21-dihydroxy 4,17(20)pregnadiene 3-one with 1-dehydrogenating microorganisms, for example, *Septomyxa affinis* and *Corynebacterium simplex*.

A solution containing minor quantities of $6\alpha$-methyl hydrocortisone 21-acetate associated with $6\alpha$-methyl prednisolone. This mixture occurs in the bioconversion of the former during the manufacture of methylprednisolone.

A solution of minor quantities of $6\alpha$-fluorohydrocortisone 21-acetate associated with $6\alpha$-fluoroprednisolone. This mixture occurs in the bioconversion of the former in the manufacture of 6-fluoroprednisolone.

The reaction between the hydrazo-reactive ketone and the insoluble solid material containing available acylhydrazide groups is carried out in the presence of an acid, and since the hydrazo-reactive ketone is often water-insoluble, we have found it convenient to determine the amount of acid by simply making a measurement of the apparent pH of the solution with a conventional pH measuring device. We have discovered that this method is effective in determining the operational amount of acid even though the solution, e.g., the hydrazone-reactive steroid ketones, are characteristically low in water content.

For the steroid ketone mixture or the candidate solution which may contain only a steroid ketone that is hydrazo-reactive which is to be separated from its solution environment, any organic solvent can be used, except, of course, the ketonic solvents which would interfere in the reaction such as acetone and the like. Nonketonic polar solvents are preferred and examples of suitable solvents are the alkanols such as methanol, ethanol, propanol, isopropanol, butanol, isobutanol, other oxygenated solvents dimethylformamide (DMF), dioxane, dioxolone, halogenated hydrocarbons such as trichloroethylene and ethylenedichloride, organic esters such as ethyl acetate, ethyl propionate and n-butylacetate.

The reaction is carried out at any convenient temperature at which the solution is physically stable. For alkanol solutions of mixtures of steroids, or alkanol solutions of single steroids we prefer a reaction temperature of between 30° and 70° C. for the purpose of convenience.

The time of reaction will vary with the degree of fineness of particle size of the insoluble solid reagent, the concentration of the solution being treated, and the temperature, all in accordance with known laws of mass chemical reactions. We prefer to carry out the reaction to an end point that is 90–95 percent of the full capacity of the insoluble solid reagent to react with the hydrazo-reactive ketone before applying the subsequent regenerating procedure to the reagent.

In carrying out our invention, a methanol solution of a mixture of prednisone and cortisone in the molecular proportion of 10–20:1 can be treated by reactive contact with a methyl acrylate:divinylbenzene resin that has been reacted in finely subdivided state with hydrazine hydrate; and the remaining solution will be completely free of cortisone.

Regeneration of the resin by aqueous acid treatment can be accomplished by contacting the charged resin with a mixture of aqueous acid at pH 0.5–4.0 and an organic ester such as ethylacetate, ethylpropionate or n-butylacetate. This treatment regenerates the acyl-hydrazide groups from the resin while simultaneously removing by dissolution in the organic ester, the hydrazo-reactive ketone.

Because hydrazo-reactivity of organic ketones is a relative matter, it will be apparent to those skilled in the art that the reaction characterizing this invention can be carried out so as to produce a resin-treated effluent that is completely freed of hydrazo-reactive ketones as one desirable end; or it can be carried out so as to produce a pure ketone product upon regeneration of the resin as another end. In each of these kinds of reactions one of the two products is "pure," and the other can be a mixture of two ketones, one of which is the hydrazo-reactive ketone and the other of which is the hydrazo-unreactive ketone. As an example of this feature, when one produces an effluent by contacting with the acyl-hydrazide resin so that all hydrazo-reactive ketones are removed, the material recovered from the resin regeneration step will be likely to contain minor proportional amounts of ketones of the "non-reactive" type that were reacted as a consequence of the principle of mass chemical reaction.

DETAILED DESCRIPTION OF THE INVENTION

Example 1 Preparation of Resin Containing Acyl-hydrazide Groups

A cross-linked methyl acrylate-divinyl benzene copolymer (Rohm and Haas JN 397c) in the form of beads of about 50 mesh is suspended in hydrazine hydrate and the reaction mixture held at about 50° C. for about 24 hours. The number of hydrazide groups introduced can be assayed iodometrically. Alternatively 100 mesh particles can be used, with a consonant reduction in reaction time and significantly shorter loading time and significantly greater loading with hydrazide groups.

In place of the cross-linked methyl acrylate copolymer, carboxymethyl cellulose in finely divided particle form can be used.

Example 2 Reaction with Steroid Mixture

The resin of Example 1 was mixed with a solution of cortisone acetate/prednisone acetate mixture in methanol; the ratio of the two steroids being 4:96. This mixture is typical of those obtained in the 1-dehydrogenation of cortisone acetate to prednisone acetate. The contact time was determined by assay of the solution for cortisone acetate. The reaction was carried out at 50° C. and an apparent pH of about 1 to 2. The latter can be maintained by the addition of sulfuric acid or hydrochloric acid as a concentrated aqueous solution.

On the 50-mesh beads the reaction of cortisone acetate was quite slow, but on the 100-mesh resin the solution phase contained no cortisone acetate after 2 hours, whereas only 0.9 percent of the prednisone acetate had been removed. The solution can be treated to recover prednisone acetate with no contaminating cortisone acetate.

Example 3 Separation of 11β,21-dihydroxy-3-keto-4,17(20)-prednadiene (dienediol) from admixture with 11β,21-dihydroxy-3-keto-1,4,17(20)-pregnatriene (trienediol)

The procedure of Example 2 was repeated, using instead a solution in methanol of a mixture of trienediol and dienediol of the same proportions. The 50-mesh beads accomplished slow removal by reaction of dienediol, as the hydrazone, combined with the resin hydrazo groups. The 100-mesh resin accomplished absorption at a greater rate than was accomplished with the 100-mesh material in Example 2, with the same sharpness of separation. In place of the mixture of this example, the separation can be accomplished in a similar manner for any of the typical pairs of hydrazo unreactive ketones as described above.

Example 4 Recovery of Steriod from the Hydrazone Resin

This procedure may be termed resin regeneration or steroid recovery, as both results are accomplished. The cortisone acetate ethyl Girard hydrazone is hydrolyzed at pH 1 in aqueous acid admixed with ethyl acetate as the inert organic solvent for the liberated steroid. The resin is slurried in the liquid medium for about 1 hour and then separated by filtration. The regenerated resin can be reused in succeeding cycles of reaction and acid regeneration.

We claim:

1. A method for separating a $\Delta^{1,4}$-3-keto steroid (1) from an environment containing it which comprises bringing a solution of 1 into reactive contact with an insoluble solid material containing available acylhydrazide groups in the presence of an acid whereby is formed a chemical hydrazo bond between 1 and said insoluble solid material, separating the reacted insoluble solid material from said liquid environment and regenerating 1 by reaction with an acid in the presence of a solvent for 1.

2. The method of claim 1 wherein the $\Delta^{1,4}$-3-keto steroid is present in a liquid environment also containing a $\Delta^4$-3-keto steroid.

3. The method of claim 2 wherein the insoluble solid material containing available acylhydrazide groups is a cross-linked polyacrylic resin that has been reacted with hydrazine.

4. The method of claim 3 wherein the liquid environment contains in solution cortisone acetate and prednisone acetate.

5. The method of claim 3 wherein the liquid environment contains in solution 11β,21-dihydroxy-3-keto-4,17(20)-pregnadiene and 11β,21-dihydroxy-3-keto-1,4,17(20)-pregnatriene.

6. The method of claim 3 wherein the reactive contact of the $\Delta^{1,4}$-3-keto steroid and resin hydrazide compound is carried out in a liquid environment comprising a non-ketonic polar organic solvent.

7. The method of claim 6 wherein the regeneration step is carried out at pH 0.5 to 4.0.

8. The method of claim 3 wherein the $-\Delta^{1,4}$-3-keto steroid is present in proportionally less amounts than the $\Delta^4$-3-keto steroid.

* * * * *